United States Patent
Binyamin (10) Patent No.: US 11,040,292 B2
(45) Date of Patent: Jun. 22, 2021

(54) SYSTEM FOR OBTAINING AN INTERACTION BETWEEN A PERSON IN CHARGE AND A CHILD BY MEANS OF A TOY

(71) Applicant: Ifat Binyamin, Tel Aviv (IL)

(72) Inventor: Ifat Binyamin, Tel Aviv (IL)

(*) Notice: Subject to any disclaimer, the term of this patent is extended or adjusted under 35 U.S.C. 154(b) by 63 days.

(21) Appl. No.: 16/434,560

(22) Filed: Jun. 7, 2019

(65) Prior Publication Data
US 2020/0384378 A1    Dec. 10, 2020

(51) Int. Cl.
*A63H 33/26* (2006.01)
*G06F 3/01* (2006.01)
*G10L 15/04* (2013.01)
*G10L 15/22* (2006.01)
*G10L 15/08* (2006.01)

(52) U.S. Cl.
CPC ............ *A63H 33/26* (2013.01); *G06F 3/017* (2013.01); *G10L 15/04* (2013.01); *G10L 15/08* (2013.01); *G10L 15/22* (2013.01); *A63H 2200/00* (2013.01); *G10L 2015/088* (2013.01); *G10L 2015/223* (2013.01)

(58) Field of Classification Search
CPC .... A63H 33/26; A63H 2200/00; A63H 30/00; A63H 30/04; G06F 3/017; G10L 15/04; G10L 15/08; G10L 15/22; G10L 2015/088; G10L 2015/223
USPC ............................................. 455/41.1–41.3
See application file for complete search history.

(56) References Cited

U.S. PATENT DOCUMENTS

| | | |
|---|---|---|
| 10,147,441 B1 | 12/2018 | Pogue et al. |
| 2009/0197504 A1* | 8/2009 | Hsu .......................... A63H 3/28 446/301 |
| 2015/0133025 A1* | 5/2015 | Ponomarev ............. A63H 3/36 446/484 |
| 2015/0138133 A1 | 5/2015 | Kim et al. |
| 2016/0057384 A1* | 2/2016 | Nakamura ............. H04N 7/142 348/14.02 |

* cited by examiner

*Primary Examiner* — Lee Nguyen
(74) *Attorney, Agent, or Firm* — Procopio, Cory, Hargreaves & Savitch LLP.

(57) ABSTRACT

A system for obtaining an interaction between a person in charge and a child with a toy including an electronic module, a controller device and a computer application executed by said controller device wherein, by the execution of said computer application, a processor of said controller device performs the operations: reading, from said a storage memory, information corresponding to a profile of said child, said profile including at least one interest of said child; displaying, by means of a display, a list of activities, said list of activities including at least one activity option, said at least one activity option being related to said at least one interest of said child; obtaining, by means of said a user input interface, a selected activity from said list of activities; and communicating information corresponding to instructions related to said selected activity to said wearable electronic module by means of appropriate communicating means.

16 Claims, 5 Drawing Sheets

SYSTEM FOR OBTAINING AN INTERACTION BETWEEN A PERSON IN CHARGE AND A CHILD BY MEANS OF A TOY

TECHNICAL FIELD OF THE INVENTION

The present invention is related to the field of smart toys and provides a system for obtaining an interaction between a person in charge and a child by means of a toy.

BACKGROUND OF THE INVENTION

Smart toys, that is, toys including hardware and/or software components for interacting with a child, are known in the prior art.

For example, the document US 2015/138133 provides an anthropomorphic device that may be a toy or a doll. Said device may be configured one or more multimedia devices. By receiving or detecting a critical signal, the device may point its sight to a source of the signal and, in response to a voice command, relate said voice command to a particular media device.

On the other hand, the document U.S. Pat. No. 10,147,441 provides a distributed system controlled by voice and has a main assistant and one or more secondary assistants. Each assistant has one or more microphones, for receiving voice instructions, computing capabilities and a WLAN interface. In this way, the voice-controlled system may be implemented as a set of handsfree devices that depend almost exclusively on the voice interactions with a user.

Nevertheless, the previously existing systems lack the capability of turning a regular toy into a smart toy that may be used for obtaining an interaction between a person in charge and a child. Therefore, there is a need of a system for obtaining an interaction between a person in charge and a child by means of a toy.

SUMMARY OF THE INVENTION

The present invention provides a system for obtaining an interaction between a person in charge and a child by means of a toy, comprising: a wearable electronic module, said wearable electronic module including a first processor, a first storage memory operatively connected to said first processor, a speaker operatively connected to said first processor and a first wireless communicating means operatively connected to said first processor; a housing containing said first processor, said first storage memory, said speaker and said first wireless transceiver, said housing also including attaching means to said toy; a controller device, said controller device including a second processor, a second storage memory operatively connected to said second processor, a second communicating means operatively connected to said second processor and in communication with said first wireless communicating means; a user input interface operatively connected to said second processor; and a display operatively connected to said second processor; and a computer application stored in said second storage memory and executed by said second processor;

wherein said first processor is configured to: receive information corresponding to instructions by means of said first wireless communicating means; store information in said first storage memory; read information from said first storage memory; and operate said speaker in response to said instructions;

wherein said second processor is configured to: transmit information corresponding to instructions by means of said second communicating means; store information in said second storage memory; read information from said second storage memory; receive inputs form said person in charge by means of said user input interface; display information by means of said display; and execute said computer application;

and wherein, by the execution of said computer application, said second processor performs the following operations: reading, from said second storage memory, information corresponding to a profile of said child, said profile including at least one interest of said child; displaying, by means of said display, a list of activities, said list of activities including at least one activity option, said at least one activity option being related to said at least one interest of said child; obtaining, by means of said user input interface, a selected activity from said list of activities; and communicating information corresponding to instructions related to said selected activity to said first processor by means of said second communicating means.

In a preferred embodiment, the system additionally comprises: a server, said server including a third processor, a third storage memory operatively connected to said third processor, and a third communicating means operatively connected to said third processor and in communication with said second communicating means;

wherein said second processor is additionally configured to: transmit information to said third processor by means of said second communicating means; and receive information from said third processor by means of said second communicating means;

wherein said third processor is configured to receive information from said second processor by means of said third communicating means; transmit information to said second processor by means of said third communicating means; store information in said second storage memory; and read information from said second storage memory;

wherein said third storage memory stores information corresponding to at least one activity, said at least one activity being related to at least one potential interest;

wherein, by the execution of said computer application, said second processor additionally performs the following operations: transmitting, to said third processor, said information corresponding to said profile of said child by means of said second communicating means; receiving, from said third processor, information corresponding to said list of activities by means of said second communicating means; and storing, in said second storage memory, said information corresponding to said list of activities;

and wherein, in response to receiving said information corresponding to said profile of said child, said third processor executes the following operations: obtaining, from said third memory storage, said list of activities including at least an activity related to said interest of said child; and transmitting, by means of said third communicating means, said list of activities to said second processor. In a further preferred embodiment, in response to receiving said information corresponding to said profile of said child, said third processor additionally stores said information corresponding to said profile of said child in said third storage memory. In another further preferred embodiment, said information corresponding to said at least one activity stored in said third storage memory includes information corresponding to an activity profile of said at least one activity.

In a preferred embodiment, by the execution of said computer application, said second processor additionally performs the following operations: obtaining, by means of said user input interface, information corresponding to said profile of said child, said profile including said at least one interest of said child; and storing, in said second storage memory, said information corresponding to said profile of said child. In a further preferred embodiment, by the execution of said computer application, said second processor additionally performs the operation of updating the information corresponding to a previously existing profile of said child in said second storage memory.

In another preferred embodiment, said second communicating and said first wireless communicating means are communicated by means an option selected from the group formed by a internet, wide area network, local area network (LAN), wireless local area network (WLAN), and personal area network (PAN).

In a preferred embodiment, said second communicating means are wireless; and wherein said second communicating means and said first wireless communicating means are both selected from the group formed by Bluetooth antennas and wi-fi antennas.

In another preferred embodiment, said user input interface is a microphone and wherein said second processor is configured to recognize a word or phrase containing said selected activity in a sound captured by said microphone; and interpret said word or phrase as an instruction for select said selected activity.

In a preferred embodiment, said user input interface is a keyboard or a touchscreen including a touchable keyboard and said second processor is additionally configured to recognize a text typed by said person in charge by means of said keyboard or touchable keyboard, and to communicate information corresponding to said text to said first processor by means of said second communicating means; and said first processor is additionally configured to receive said information corresponding to said text by means of said first wireless communicating means and to control the speaker to reproduce said text into voice. In a further preferred embodiment, said second processor is additionally configured to convert said recognized text into an audio file, and to communicate said audio file to said first processor.

In an additional preferred embodiment, said wearable electronic module includes a button operatively connected to said first processor; wherein said first processor is configured to: recognize a gesture performed by said child on said button; interpret said gesture as a feedback instruction; and execute said feedback instruction.

In a preferred embodiment, said controller device additionally includes a clock operatively connected to said second processor; wherein said second processor is additionally configured to obtain a time from said clock; and wherein, by the execution of said computer application, said second processor performs the operations of: programming said selected activity for a certain time indicated by said clock; and communicating said information corresponding to instructions related to said selected activity to said first processor at that certain time.

In another preferred embodiment, said wearable electronic module includes an internal battery operatively connected to said processor, to said speaker, and to said wireless communicating means; wherein said first processor is configured to obtain a state of charge of said battery; and communicate information corresponding to said state of charge to the second processor by means of said wireless communicating means; and wherein said second processor is configured to receive said information corresponding to said state of charge by means of said second communicating means; and display said state of charge by means of said display. In a further preferred embodiment, said wearable electronic module additionally includes an electrical charging interface for said internal battery.

In a preferred embodiment, said attaching means are selected from the group formed by a necklace, a pin, a hook and loop fastener, a cord, a magnet, as well as combinations thereof.

DETAILED DESCRIPTION OF THE INVENTION

As schematically shown in the accompanying drawings, the present invention provides a system (1) for obtaining an interaction between a person in charge (2) and a child (3) by means of a toy (4), comprising: a wearable electronic module (5), said wearable electronic module (5) including a first processor (51), a first storage memory (52) operatively connected to said first processor (51), a speaker (53) operatively connected to said first processor (51) and a first wireless communicating means (54) operatively connected to said first processor (51); a housing (55) containing said first processor (51), said first storage memory (52), said speaker (53) and said first wireless transceiver (54), said housing (55) also including attaching means (not shown in the figures) to said toy (4); a controller device (6), said controller device (6) including a second processor (61), a second storage memory (62) operatively connected to said second processor (61), a second communicating means (63) operatively connected to said second processor (61) and in communication with said first wireless communicating means (54); a user input interface (64) operatively connected to said second processor (61);

and a display (65) operatively connected to said second processor (61); and a computer application (7) stored in said second storage memory (62) and executed by said second processor (61);

wherein said first processor (51) is configured to:
receive information corresponding to instructions by means of said first wireless communicating means (54);
store information in said first storage memory (52);
read information from said first storage memory (52); and operate said speaker (54) in response to said instructions;
wherein said second processor (61) is configured to:
transmit information corresponding to instructions by means of said second communicating means (63);
store information in said second storage memory (62);
read information from said second storage memory (62);
receive inputs form said person in charge (2) by means of said user input interface (64);
display information by means of said display; and
execute said computer application (7); and
wherein, by the execution of said computer application (7), said second processor (61) performs the following operations:
reading, from said second storage memory (62), information corresponding to a profile of said child (3), said profile including at least one interest of said child (3);
displaying, by means of said display, a list of activities, said list of activities including at least one activity option, said at least one activity option being related to said at least one interest of said child (3);
obtaining, by means of said user input interface (64), a selected activity from said list of activities; and
communicating information corresponding to instructions related to said selected activity to said first processor (51) by means of said second communicating means (63).

In the context of the present invention, it is to be understood that a storage memory, either said first storage memory (52) or said second storage memory (62), may be any known device for storing information. Said device for storing information may be, for example and without limiting the scope of the present invention, selected from the group formed by volatile and non-volatile memories, as well as combinations thereof.

On the other hand, it is to be understood that a communicating means, either said first wireless communicating means (54) or said second communicating means (63), may be any known device for transmitting or receiving information. In the case of said first wireless communicating means (54), said transmission or reception is wireless. Nevertheless, in the case of said second communicating means (63) said transmission or reception may be both, wired or wireless, as well as a combination thereof and, therefore, said second communicating means (63) may be either wired or wireless communicating means. Non limiting examples of wireless communicating means are antennas, which may work in any wavelength. On the other hand, non limiting examples of wired communicating means are twisted pair cables, for example UTP and STP cables, optical fibers and coaxial cables.

The way in which said first wireless communicating means (54) and said second communicating means (63) are communicated does not limit the scope of the present invention. For example, said first wireless communicating means (54) and said second communicating means (63) are communicated by means of an option selected from the group formed by internet, a wide area network, a local area network (LAN), a wireless local area network (WLAN), and a personal area network (PAN), as well as combinations thereof. In the case that a wide area network or the internet are used, said first wireless communicating means (54) and said second communicating means (63) might not be in the same room or building. In that case, one or more intermediate devices, for example and without limiting to those a router or a switch, may be used for establishing said communication.

On the other hand, when a WLAN or a PAN networks are used, said first wireless communicating means (54) and said second communicating means (63) are near to each other, for example and without limiting the scope of the present invention, in the same room or building. In that case, the communication protocol that is used does not limit the scope of the present invention. In a preferred embodiment, without limiting the scope of the present invention, said second communicating means (63) are wireless; and said second communicating means (63) and said first wireless communicating means (54) are both selected from the group formed by Bluetooth antennas and wi-fi antennas.

In the context of the present invention, it is to be understood that a user input interface (64) may be any known device for giving inputs to said second processor (61). Said input may be, without limiting to those, one or more of a gesture, a voice instruction, a movement, a sound, as well as combinations thereof. Therefore, the nature of said user input interface (64) will depend on the nature of the input. For example, and without limiting the scope of the present invention, when said input is a sound or a voice instruction, said user input interface (64) may be a microphone. In other example, without limiting the scope of the present invention, when said input is a movement of said user, said user input interface (64) may comprise an accelerometer and/or a gyroscope. In other example, without limiting the scope of the present invention, when said input is a gesture, said user input interface may be a touchable screen. A person ordinarily skilled in the relevant art will find an adequate user input interface (64) for a certain kind of input.

In the context of the present invention, it is to be understood that a profile of a child (3) is a list of characteristics of said child (3) and may include, without limiting to those, a name, a last name, an age or date of birth, a language, among others. Said profile of said child (3) also includes at least one interest of said child (3). Said interest of said child (3) may be any topic or set of tasks in which said child (3) is interested, as may be, for example and without limiting to those, cars, flowers, dinosaurs, dolls, sports, storytelling, costumes, cooking, building, among others.

Figure 3:
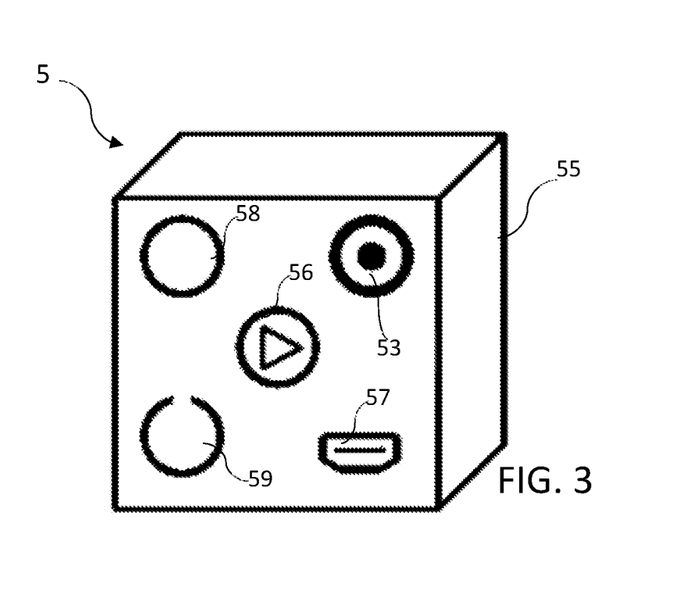
FIG. 3 shows a front schematic view of a first embodiment of the wearable electronic module that is part of the system of the present invention.

Regarding said wearable electronic module (5), a first embodiment of the same is schematically shown in FIG. 3. Said wearable electronic module (5) may be attached to a toy (4) by means of said attaching means. In this way, as will be further explained later, any toy may be turned into a smart toy. Said attaching means may be any suitable means for performing said task and may be selected, without limiting to those, from the group formed by a necklace, a pin, a hook and loop fastener, a cord, a magnet, as well as combinations thereof. A person ordinarily skilled in the relevant art will note that the nature of the attaching means depends, among others, on the nature of the toy (4) to which the wearable electronic module (5) is attached. Therefore, in a preferred embodiment, said attaching means are exchangeable, which allows to attach the wearable electronic module (5) to different kind of toys (4).

The shape of said electronic wearable module (5) does not limit the scope of the present invention. For example, in some embodiments, said electronic wearable module (5) may have the shape of a heart. In other embodiments, without limiting the scope of the present invention, said electronic wearable module (5) may have the shape of a ball. In other embodiments, without limiting the scope of the present invention, said electronic wearable module (5) may have the shape of a badge. On the other hand, the dimensions of said wearable electronic module (5) do not limit the scope of the present invention. Said wearable electronic module (5), for example and without limiting the scope of the present invention, may have an overall height between 25 mm and 55 mm. In other embodiments, said wearable electronic module (5), for example and without limiting the scope of the present invention, may have an overall width between 25 mm and 55 mm. In other embodiments, said wearable electronic module (5), for example and without limiting the scope of the present invention, may have an overall thickness between 5 mm and 20 mm.

Said wearable electronic module (5) may include additional features without limiting the scope of the present invention. For example, as shown in FIG. 3 and without limiting the scope of the present invention, said wearable electronic module (5) may include a button (56), operatively connected to said first processor and contained in said housing. Said button (56) may be used for obtaining a feedback from said child (3). In the context of the present invention, it is to be understood that said button (56) may be implemented as a physical button or a logical button. A physical button is understood as a button that may be physically pushed or interacted with. A logical button, on the other hand, is understood as a button defined in a certain area of an interface, e.g. a touchscreen. In this case, it is interpreted that the button is "pushed" when an interaction is performed over said certain area.

In the preferred embodiment in which the wearable electronic module (5) includes a button (56), said first processor is configured to: recognize a gesture performed by said child on said button; interpret said gesture as a feedback instruction; and execute said feedback instruction. The nature of said feedback instruction does not limit the scope of the present invention. For example, and without limiting the scope of the present invention, the selected activity may require the child (3) to perform a certain task and to push the button after the task is performed. In this case, said gesture is interpreted by the first processor (51) as an indication that the task has been completed. In other example, and without limiting the scope of the present invention, said child may push said button (56) when she or he is in a certain mood, for example bored or sleepy. In this case, said gesture is interpreted by the first processor (51) as an indication that the child is requiring to stop or change the activity. Nevertheless, the nature of the gesture, as well as the interpretation that the first processor makes of said gesture, do not limit the scope of the present invention.

In other preferred embodiment, without limiting the scope of the present invention, said wearable electronic module (5) may include an internal battery (not shown in the drawings) operatively connected to said processor (51), to said speaker (52), and to said wireless communicating means (54). Said internal battery may be any type of battery known in the prior art without limiting the scope of the present invention. In embodiments in which said wearable electronic module (5) includes additional features, such as a button (56), said battery is also operatively connected to said additional features.

In the preferred embodiment in which said wearable electronic module (5) includes an internal battery, said first processor (51) is configured to obtain a state of charge of said battery; and communicate information corresponding to said state of charge to the second processor (61) by means of said first wireless communicating means (54). Said second processor (61), on its side, is configured to receive said information corresponding to said state of charge by means of the second communicating means (63); and display said state of charge by means of said display (65). In this way, said person in charge (2) may be aware of the state of charge of said battery, and charge said battery when the level of charge is low.

The way in which said battery is charged does not limit the scope of the present invention. Nevertheless, in a preferred embodiment, said wearable electronic module (5) additionally includes an electrical charging interface (57) for said internal battery. Said electrical charging interface may be any charging device previously known in the prior art and may be selected, without limiting to those, from the group formed by a USB connector, a DC connector and a coaxial connector.

In a preferred embodiment, said wearable electronic module (5) may include other features. For example, as shown in FIG. 3 and without limiting the scope of the present invention, said wearable electronic module (5) may include a LED indicator (58) which may be used as an indicator that the wearable electronic module is on and/or for providing feedback to the child (3). Said wearable electronic module (5) may also include a second button (59), that may also be a physical or a logical button without limiting the scope of the present invention, and that may be used for obtaining additional feedback from said child (3) or for turning the wearable electronic module (5) either on or off.

Figure 6:
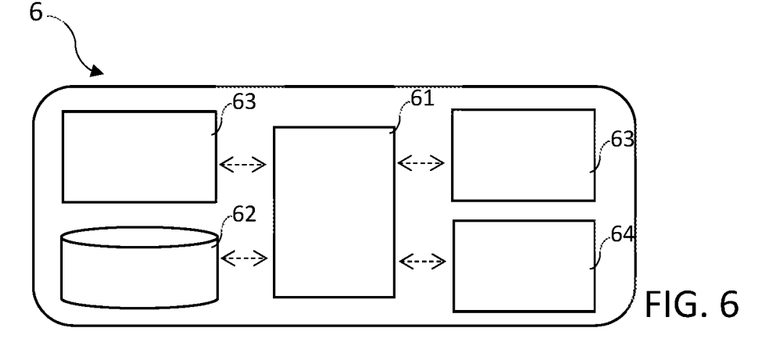
FIG. 6 shows a schematic block diagram of a first embodiment of the controller device that is part of the system of the present invention.

Regarding the controller device (6), a schematic block diagram is shown in FIG. 6. Said controller device (6) may be any suitable device for controlling said wearable electronic module (5) and includes said second processor (61), said second storage memory (62) operatively connected to said second processor (61), said second communicating means (63) operatively connected to said second processor (61) and in communication with said first wireless communicating means (54); said user input interface (64) operatively connected to said second processor (61); and said display (65) operatively connected to said second processor (61). In a preferred embodiment, without limiting the scope of the present invention, said controller device (6) is a smartphone. In said preferred embodiment, without limiting the scope of the present invention, any of the input interfaces being present in said smartphone may be used as said user input interface (64), such as the touchscreen, the microphone, the camera, the accelerometer or gyroscope, as well as combinations thereof. Nevertheless, in other preferred embodiments, without limiting the scope of the present invention, said controller device (6) may be selected from the group formed by a personal computer, a smartwatch, a tablet device, a smart TV, as well as combinations thereof. A person ordinarily skilled in the relevant art will find suitable user input interfaces (65) for each kind of controller device (6), without limiting the scope of the present invention.

As was previously stated, in a preferred embodiment, without limiting the scope of the present invention, said user input interface (64) may be a microphone. In said preferred embodiment, said second processor (61) may be configured to recognize a word or phrase containing the selected activity in a sound captured by said microphone; and to interpret said word or phrase as an instruction for selecting said selected activity. Any voice recognition algorithm may be used by said second processor (61) for recognizing said word or phrase containing said selected activity without limiting the scope of the present invention. In the case in which said controller device (6) is a smartphone or a tablet device, without limiting the scope of the present invention, the internal voice recognition capabilities may be used for recognizing said word or phrase containing said selected activity.

In a preferred embodiment, without limiting the scope of the present invention, said controller device (6) may include a clock (not shown in the figures) operatively connected to said second processor (61). In this preferred embodiment, without limiting the scope of the present invention, said second processor (61) is additionally configured to obtain a time from said clock. In this sense, and as will be further explained later, it is possible to program an activity for a certain time, as indicated by said clock.

Figure 7:
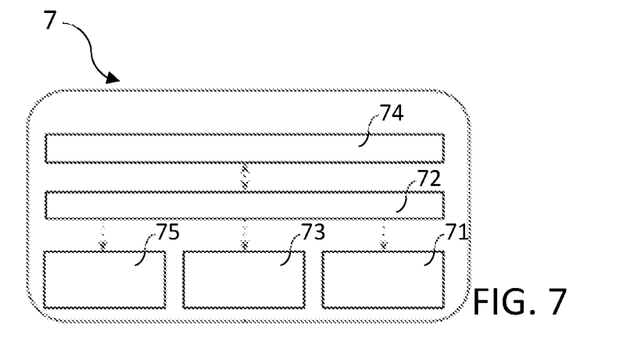
FIG. 7 shows a schematic block diagram of a first embodiment of the computer application that is part of the system of the present invention.

Regarding the computer application (7), the same is stored in the second storage memory (62) and, by its execution, it is possible to obtain the interaction between the person in charge (2) and the child (3). By the execution of said computer application (7), said second processor (61) performs the following operations:

- reading, from said second storage memory (62), information corresponding to a profile of said child (3), said profile including at least one interest of said child (3);
- displaying, by means of said display, a list of activities, said list of activities including at least one activity option, said at least one activity option being related to said at least one interest of said child (3);
- obtaining, by means of said user input interface (64), a selected activity from said list of activities; and
- communicating information corresponding to instructions related to said selected activity to said first processor (51) by means of said second communicating means (63).

Additionally, since the first processor (51) is configured to operate the speaker (54) of the wearable electronic module (5) in response to said instructions, the selected activity is effectively performed by the child (3).

In the context of the present invention, it is to be understood that an activity may be any set of operations, tasks or roles to be performed by said child (3). In some embodiments, without limiting the scope of the present invention, said activity may imply an active role of the child (3), such as those involving physical activity. Nevertheless, in other embodiments, without limiting the scope of the present invention, said activity may imply a passive role of the child (3), such as those involving hearing to a story or a song. However, some activities may involve both, an active role and a passive role of said child, such as those involving conditional actions.

In a preferred embodiment, without limiting the scope of the invention, said activity may imply an active role of the person in charge (2). For example, and without limiting the scope of the present invention, said person in charge (2) may want to tell a story or give instructions to said child (3). In this case, without limiting the scope of the present invention, the user input interface (64) of the controller device may include a keyboard or a touchscreen including a touchable keyboard and the second processor (61) of the controller device (6) may be configured to recognize the text typed by the person in charge and to communicate information corresponding to said text to the first processor (51) of the wearable electronic module (5) by means of the second communicating means (63). Said first processor (51) on its side, may be configured to receive said information by means of the first wireless communicating means (54), recognize said text in said information and control the speaker (52) to reproduce said text into voice. Nevertheless, in another preferred embodiment, without limiting the scope of the present invention, the second processor (61) of the controller device (6) may be additionally configured to convert said recognized text into an audio file, and communicate said audio file to the first processor (51) of the wearable module (5) by means of the second communicating means (63).

In the context of the present invention, it is to be understood that a computer application (7) may be any set of instructions that performs a specific task when executed by said second processor (61). Said computer application may be written in any suitable programming language without limiting the scope of the present invention.

A schematic block diagram of a preferred embodiment of said computer application (7) is shown in FIG. 7. In said preferred embodiment, without limiting the scope of the present invention, a first functional block is implemented as an application program interface (71) for allowing third parties to develop content and/or additional features for said computer application (7). Examples of content for said computer application (7), without limiting the scope of the present invention, are activities.

A second block of said preferred embodiment of said computer application (7) is an application flow (72) block, that is, the effective set of instructions to be performed by the second processor (61). As previously stated, the specific set of instructions, as well as the programming language in which the same are provided, do not limit the scope of the present invention, provided that the second processor (61) performs the required operations by the execution of the same.

A third functional block of said computer application is a local data access (73) block, which allows to store information and get information from said second storage memory (62). Additionally, this functional block may be used for storing cached data.

A fourth functional block is a user interface (74) block. This block allows to manage the information that is provided by means of the user input interface (64), as well as to manage the information that is shown by means of the display (65) of the controller device (6).

A fifth functional block of the computer application (7) is a firmware interaction (75) block. Said block allows the controller device (6) to interact with the wearable electronic module (5). Therefore, said block makes it possible to send the instructions from the second processor (61) to the first processor (51) and to receive information from said first processor (51) to said second processor (61) in embodiments of the present invention in which said interaction is also provided.

As was previously stated, by the execution of the computer application (7), the second processor (61) may perform additional operations, without limiting the scope of the present invention. In general, without limiting the scope of the present invention, said additional operations will depend on the technical features of both, the wearable electronic module (5) and the controller device (6). Said technical features may include, without limiting to those, the presence of buttons (56, 59) or lights (58) in the wearable electronic module (5) and the nature of the user input interface (64) or the presence of a clock in the controller device (6).

Particularly, without limiting the scope of the present invention, when said controller device (6) includes a clock, the execution of said computer application (7) makes said second processor (61) to perform the following additional operations:

- programming the selected activity for a certain time indicated by said clock; and
- communicating the information corresponding to instructions related to said selected activity to said first processor (51) at that certain time.

On the other hand, as was previously stated, additional features for said computer application (7) may be provided without limiting the scope of the present invention. In a preferred embodiment, without limiting the scope of the present invention, said second storage memory (62) may store information corresponding to a profile of the child (3). In this preferred embodiment, without limiting the scope of the present invention, by the execution of said computer application (7), said second processor (61), additionally performs the following operations:

obtaining, by means of the user input interface (64), information corresponding to the profile of said child (3), said profile including said at least one interest of said child (3); and     storing, in said second storage memory (62), said information corresponding to said profile of said child.

Nevertheless, said second processor (61) may obtain said profile of said child (3) by other ways, which may include, without limiting to it, an external database that stores said profile of said child (3). Additionally, said second processor (61) may update the information related to a previously existing profile of said child (3), that is stored in said second storage memory (62), by the execution of said computer application (7).

Figure 8:
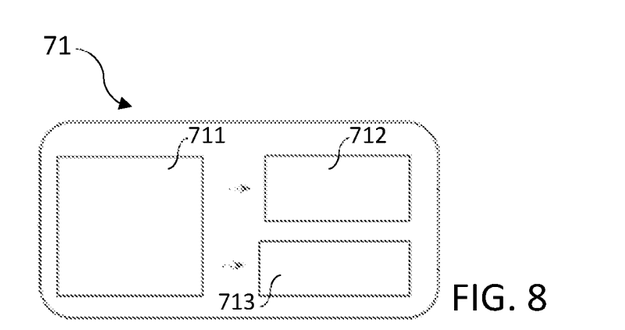
FIG. 8 shows a schematic block diagram of a first embodiment of an application program interface being part of the computer application that is part of the system of the present invention.

As was previously stated, in a preferred embodiment, without limiting the scope of the present invention, said computer application (7) includes an application program interface (71) functional block. A block diagram of an embodiment of said application program interface (71) is schematically shown in FIG. 8. Said application program interface (71) may include three functional sub-blocks.

A first sub-block is a business logic (711) block. Said block allows to manage all the business logic, providing information about customers, such as credentials, personal data, preferences and configurations, content, such as stories, jingles, setting and news, and other miscellaneous data.

A second sub-block is a text-to-voice converter (712) block. Said block allows to convert text to audio through the help of a third-party service.

A third sub-bloc is a data access (713) block. Said block allows to store and recover data that may be stored in the second storage memory (62) or in an external database.

These data could be, for example and without limiting to those, texts about the content, user information, authorization credentials and other miscellaneous data.

Figure 1:
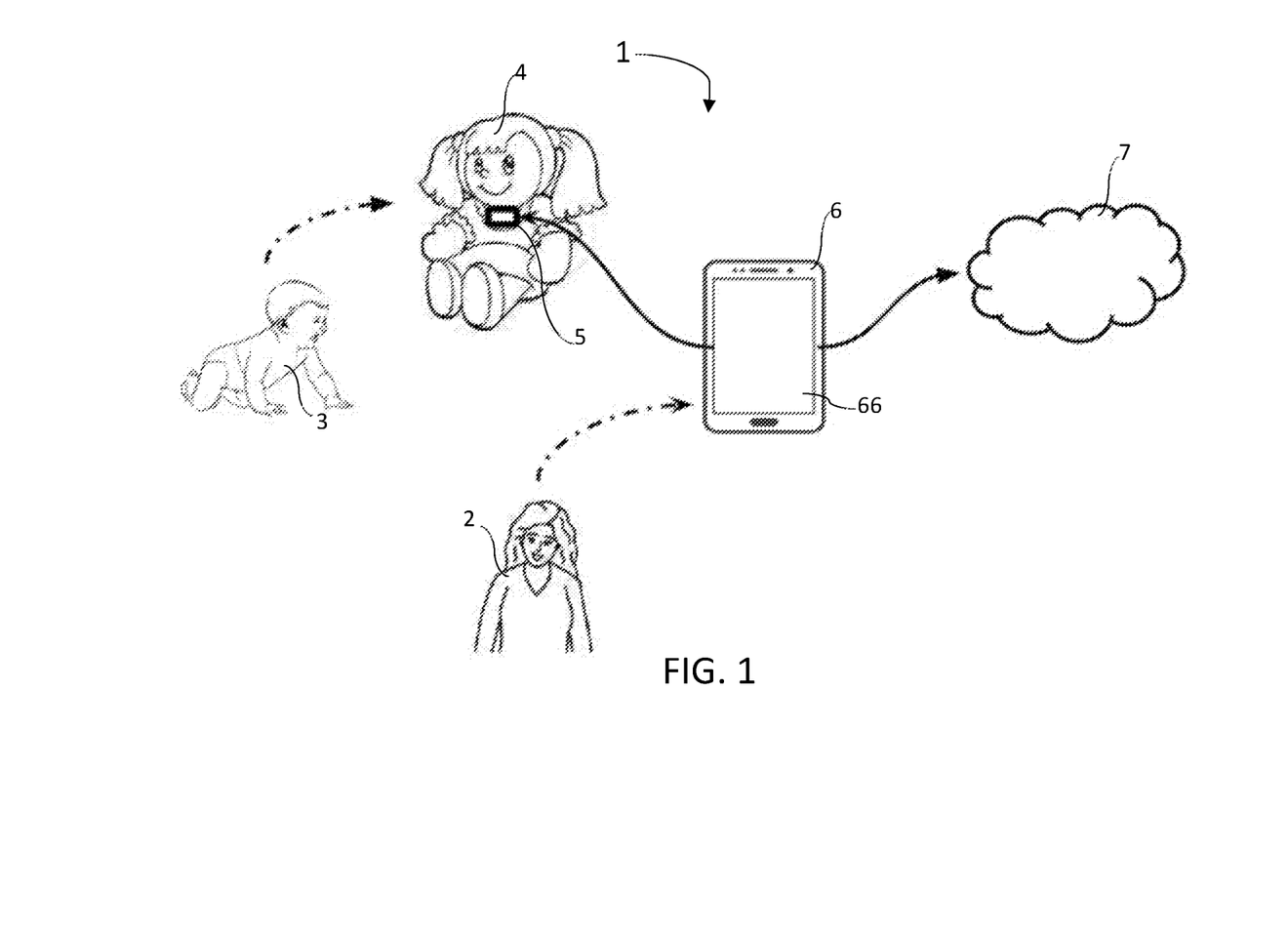
FIG. 1 shows a schematic diagram of a first embodiment of the system of the present invention.
Figure 2:
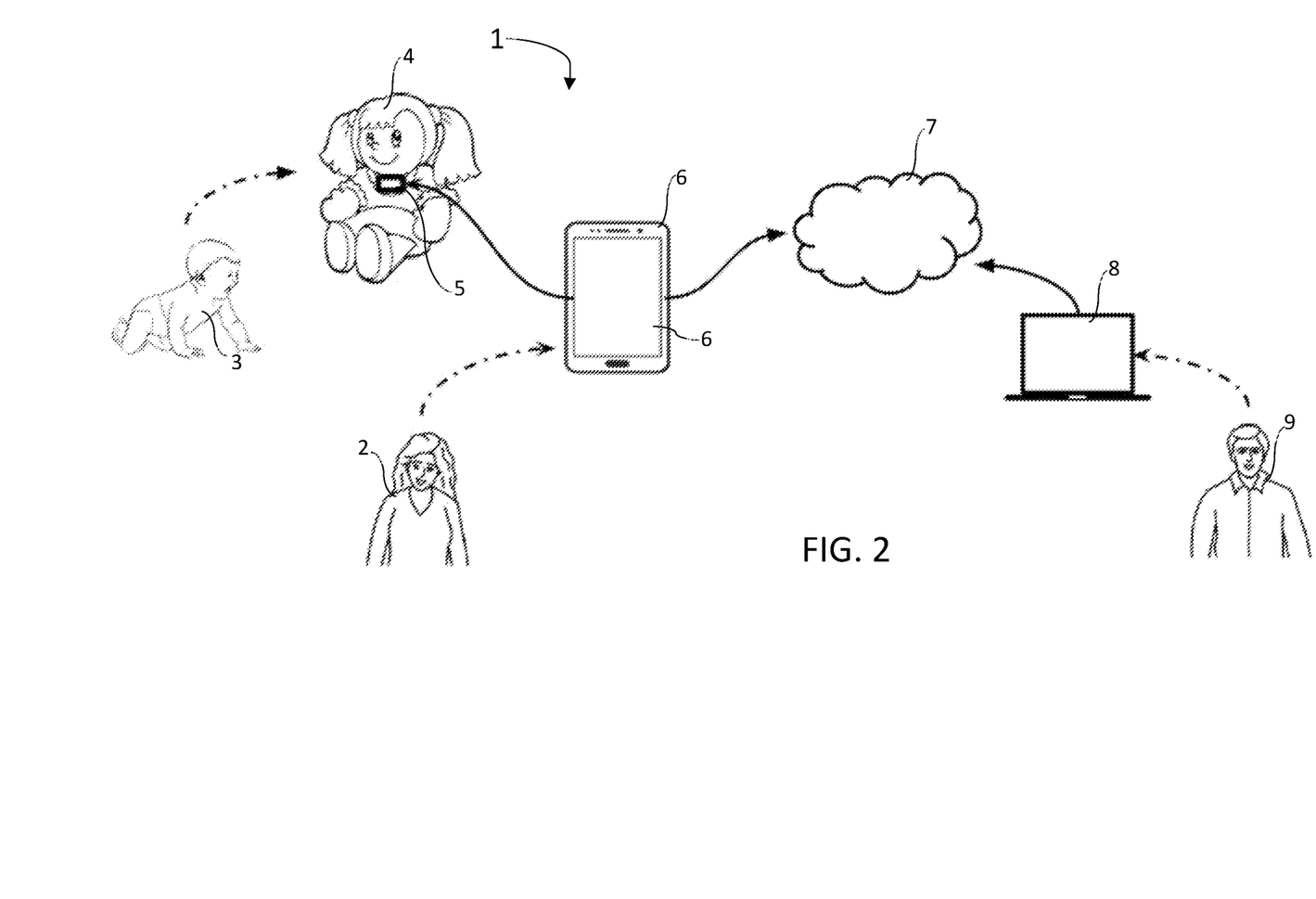
FIG. 2 shows a schematic diagram of a second embodiment of the system of the present invention.
Figure 4:
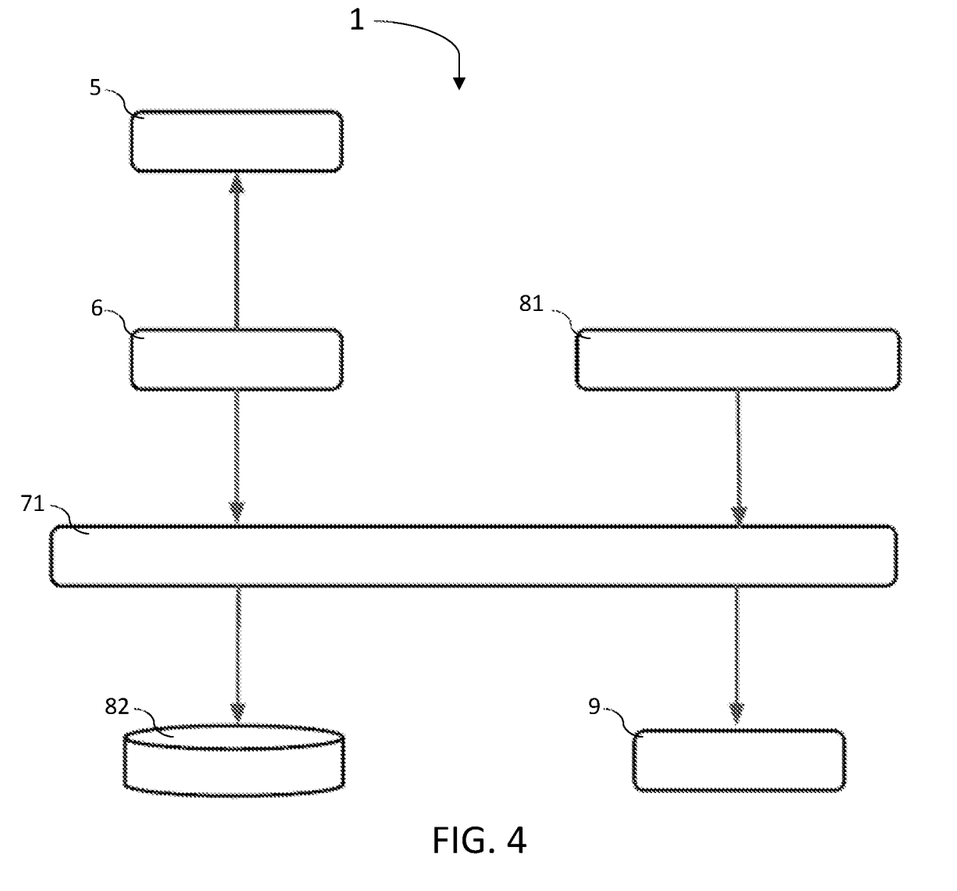
FIG. 4 shows a schematic block diagram of a second embodiment of the system of the present invention.
Figure 5:
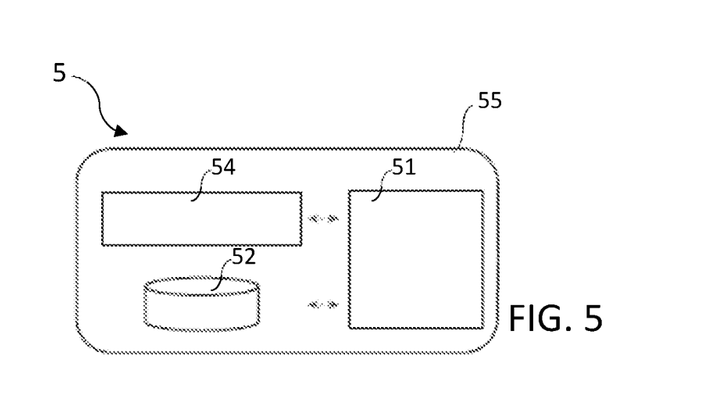
FIG. 5 shows a schematic block diagram of a first embodiment of the wearable electronic module that is part of the system of the present invention.

FIGS. 2 and 4 schematically show another preferred embodiment of the present invention. In this preferred embodiment, in addition to the wearable electronic module (5), the controller device (6) and the computer application (7), the system also includes a server (8), said server (8) including a third processor (81) a third storage memory (82) operatively connected to said third processor (81), and a third communicating means (not shown in the figures) operatively connected to said third processor (81) and in communication with said second communicating means (63). In this second embodiment, said second processor (61) is additionally configured to:

transmit information to said third processor (81) by means of said second communicating means (63); and     receive information from said third processor (81) by means of said second communicating means (63);

whereas said third processor (81) is configured to receive information from said second processor (61) by means of said third communicating means;

transmit information to said second processor (61) by means of said third communicating means;

store information in said third storage memory (82); and     read information from said third storage memory (82);

In this preferred embodiment, additionally, said third storage memory (82) stores information corresponding to at least one activity, said at least one activity being related to at least one potential interest. Additionally, in this preferred embodiment, by the execution of the computer application (7), said second processor (61) additionally performs the following operations:

transmitting, to said third processor (81), said information corresponding to said profile of said child (3) by means of said second communicating means (63);

receiving, from said third processor (81), information corresponding to said list of activities by means of said second communicating means (63); and     storing, in said second storage memory (62), said information corresponding to said list of activities; and On the other hand, in this preferred embodiment, in response to receiving said information corresponding to said profile of said child (3), said third processor (81) executes the following operations:

obtaining, from said third storage memory (82), said list of activities including at least an activity related to said interest of said child; and     transmitting, by means of said third communicating means, said list of activities to said second processor (61).

All the options previously detailed for the first wireless communicating means (54) and the second communicating means (63) may be applied to the third communicating means. On the other hand, all the options previously detailed for the first storage memory (52) and the second storage memory (62) may be applied to the third storage memory (82).

In a preferred embodiment, said third storage memory (82) may store an electronic database (not shown in the figures) that includes information related to at least one activity, and that may include information related to at least one child profile.

In the preferred embodiment in which said electronic database includes information related to at least one activity, it is possible for third parties (9) to create and/or develop activities or content for the computer application (7). This is possible by means of the application program interface (71) of said computer application. It is also possible, without limiting the scope of the present invention, to provide a backoffice service for maintenance and/or development of the computer application (7) as well as for the creation and/or development of activities or content for the computer application (7). In a further preferred embodiment, the information corresponding to said at least one activity stored in said third storage memory (82) includes information corresponding to an activity profile of said at least one activity. Said activity profile may include, without limiting to those, a list of potential interests to which said activity is related, an age range of the children for whom said activity is intended, a summary of the activity for the reading of the person in charge (2), a list of expected results after the performance of the activity, among others.

On the other hand, in the preferred embodiment in that said third storage memory (82) includes information related to at least one child profile, said third processor (81), in response to receiving said information corresponding to said profile of said child (3), stores said information corresponding to said profile of said child (3) in said third storage memory (81).

According to the previous detailed description of the invention, it is possible to obtain a system (1) for obtaining an interaction between a person in charge (2) and a child (3) by means of a toy (4), which may be used for turning any regular toy into a smart toy.

It is to be understood that different technical features described along this specification may be combined in any way foreseeable by a person ordinarily skilled in the relevant art without limiting the scope of the present invention.

The invention claimed is:

1. A system for obtaining an interaction between a person in charge and a child by means of a toy, comprising:
a wearable electronic module, said wearable electronic module including a first processor, a first storage memory operatively connected to said first processor, a speaker operatively connected to said first processor and a first wireless communicating means operatively connected to said first processor; a housing containing said first processor, said first storage memory, said speaker and said first wireless transceiver, said housing also including attaching means to said toy;
a controller device, said controller device including a second processor, a second storage memory operatively connected to said second processor, a second communicating means operatively connected to said second processor and in communication with said first wireless communicating means; a user input interface operatively connected to said second processor; and a display operatively connected to said second processor; and
a computer application stored in said second storage memory and executed by said second processor;
wherein, by said operative connection between said first processor and said first storage memory, said first processor is configured to:
receive information corresponding to instructions by means of said first wireless communicating means;
store the information in said first storage memory;
read the information from said first storage memory; and
operate said speaker in response to said instructions corresponding to the information;
wherein said second processor is configured to:
transmit the information corresponding to instructions by means of said second communicating means;
store the information in said second storage memory;
read the information from said second storage memory;
receive inputs form said person in charge by means of said user input interface;
display the information by means of said display; and
execute said computer application; and
wherein, by the execution of said computer application, said second processor performs the following operations:
reading, from said second storage memory, information corresponding to a profile of said child, said profile including at least one interest of said child;
displaying, by means of said display, a list of activities, said list of activities including at least one activity option, said at least one activity option being related to said at least one interest of said child;
obtaining, by means of said user input interface, a selected activity from said list of activities; and
communicating the information corresponding to instructions related to said selected activity to said first processor by means of said second communicating means.

2. The system according to claim 1, additionally comprising:
a server, said server including a third processor, a third storage memory operatively connected to said third processor, and a third communicating means operatively connected to said third processor and in communication with said second communicating means;
wherein said second processor is additionally configured to:
transmit the information to said third processor by means of said second communicating means; and
receive the information from said third processor by means of said second communicating means;
wherein said third processor is configured to
receive the information from said second processor by means of said third communicating means;
transmit the information to said second processor by means of said third communicating means;
store the information in said third storage memory; and
read the information from said third storage memory;
wherein said third storage memory stores information corresponding to at least one activity, said at least one activity being related to at least one potential interest;
wherein, by the execution of said computer application, said second processor additionally performs the following operations:
transmitting, to said third processor, said information corresponding to said profile of said child by means of said second communicating means;
receiving, from said third processor, information corresponding to said list of activities by means of said second communicating means; and
storing, in said second storage memory, said information corresponding to said list of activities; and
wherein, in response to receiving said information corresponding to said profile of said child, said third processor executes the following operations:
obtaining, from said third storage memory, said list of activities including at least an activity related to said interest of said child; and
transmitting, by means of said third communicating means, said list of activities to said second processor.

3. The system of claim 2, wherein in response to receiving said information corresponding to said profile of said child, said third processor additionally stores said information corresponding to said profile of said child in said third storage memory.

4. The system of claim 2, wherein said information corresponding to said at least one activity stored in said third storage memory includes information corresponding to an activity profile of said at least one activity.

5. The system of claim 1, wherein by the execution of said computer application, said second processor additionally performs the following operations:
obtaining, by means of said user input interface, information corresponding to said profile of said child, said profile including said at least one interest of said child; and
storing, in said second storage memory, said information corresponding to said profile of said child.

6. The system of claim 5, wherein by the execution of said computer application, said second processor additionally performs the operation of updating the information corresponding to a previously existing profile of said child in said second storage memory.

7. The system of claim 1, wherein said second communicating and said first wireless communicating means are communicated by means an option selected from the group formed by a internet, wide area network, local area network (LAN), wireless local area network (WLAN), and personal area network (PAN).

8. The system of claim 1, wherein said second communicating means are wireless; and wherein said second communicating means and said first wireless communicating means are both selected from the group formed by Bluetooth antennas and wi-fi antennas.

9. The system of claim 1, wherein said user input interface is a microphone and wherein said second processor is configured to recognize a word or phrase containing said selected activity in a sound captured by said microphone; and
 interpret said word or phrase as an instruction for select said selected activity.

10. The system of claim 1, wherein said user input interface is a keyboard or a touchscreen including a touchable keyboard and wherein said second processor is additionally configured to recognize a text typed by said person in charge by means of said keyboard or touchable keyboard, and to communicate information corresponding to said text to said first processor by means of said second communicating means; and wherein said first processor is additionally configured to receive said information corresponding to said text by means of said first wireless communicating means and to control the speaker to reproduce said text into voice.

11. The system of claim 10, wherein said second processor is additionally configured to convert said recognized text into an audio file, and to communicate said audio file to said first processor.

12. The system of claim 1, wherein said wearable electronic module includes a button operatively connected to said first processor and contained in said housing; and wherein said first processor is configured to:
 recognize a gesture performed by said child on said button;
 interpret said gesture as a feedback instruction; and
 execute said feedback instruction.

13. The system of claim 12, wherein said wearable electronic module additionally includes an electrical charging interface for said internal battery.

14. The system of claim 1, wherein said controller device additionally includes a clock operatively connected to said second processor; wherein said second processor is additionally configured to obtain a time from said clock; and wherein, by the execution of said computer application, said second processor performs the operations of:
 programming said selected activity for a certain time indicated by said clock; and
 communicating said information corresponding to instructions related to said selected activity to said first processor at that certain time.

15. The system of claim 1, wherein said wearable electronic module includes an internal battery operatively connected to said processor, to said speaker, and to said wireless communicating means;
 wherein said first processor is configured to obtain a state of charge of said battery; and communicate information corresponding to said state of charge to the second processor by means of said wireless communicating means; and
 wherein said second processor is configured to receive said information corresponding to said state of charge by means of said second communicating means; and display said state of charge by means of said display.

16. The system of claim 1, wherein said attaching means are selected from the group formed by a necklace, a pin, a hook and loop fastener, a cord, a magnet, as well as combinations thereof.

* * * * *